United States Patent [19]

Bayless

[11] 4,217,441

[45] Aug. 12, 1980

[54] MODIFIED POLYESTER FILMS

[75] Inventor: John H. Bayless, Hendersonville, N.C.

[73] Assignee: E. I. Du Pont de Nemours and Company, Wilmington, Del.

[21] Appl. No.: 890,485

[22] Filed: Mar. 29, 1978

Related U.S. Application Data

[63] Continuation-in-part of Ser. No. 788,780, Apr. 19, 1977, abandoned.

[51] Int. Cl.$^2$ .............................................. C08G 63/68
[52] U.S. Cl. .................................. 528/293; 260/40 R; 264/210.1; 528/275; 528/295
[58] Field of Search ................... 264/210 R; 528/293, 528/295, 275; 260/40 R

[56] References Cited

U.S. PATENT DOCUMENTS

| | | | |
|---|---|---|---|
| 3,018,272 | 1/1962 | Griffing et al. | 528/293 |
| 3,455,720 | 7/1969 | Davies et al. | 428/349 |
| 3,461,468 | 8/1969 | Morgan et al. | 8/165 |
| 3,560,605 | 2/1971 | Siggel et al. | 264/328 |
| 3,563,942 | 2/1971 | Heiberger | 260/29.2 E |
| 3,779,993 | 12/1973 | Kibler et al. | 528/295 |
| 3,853,820 | 12/1974 | Vachon | 528/295 |
| 4,042,565 | 8/1977 | Hoheisel et al. | 528/195 |

*Primary Examiner*—Lucille M. Phynes

[57] ABSTRACT

Polyester films are modified by the addition of a high molecular weight polyethylene glycol and an alkali metal salt of a sulfonic acid-substituted dicarboxylic acid ester to the reaction medium during the polymerization process. Films prepared for example, from diesters of terephthalic acid in the presence of the modifiers of this invention exhibit good permeability to water vapor.

11 Claims, 1 Drawing Figure

MODIFIED POLYESTER FILMS

CROSS-REFERENCE TO RELATED APPLICATION

This is a continuation-in-part of application Ser. No. 788,780, filed Apr. 19, 1977 now abandoned.

BACKGROUND OF THE INVENTION

This invention relates to modified polyester films and specifically to polyester films which are useful as supports or as cover layers for photosensitive systems. More specifically, this invention relates to modified films which are predominantly polyethylene terephthalate and exhibit a high degree of permeability to water vapor without substantial loss in other physical properties.

The use of polyester films as supports and as cover layers for photosensitive systems is well known in the art. Most of these films are prepared from a polymer made by first reacting ethylene glycol and terephthalic acid or conducting ester interchange between ethylene glycol and dimethyl terephthalate, and then subjecting the reaction product to conventional polymerization conditions in the presence of a catalyst. This forms polyethylene terephthalate polymer which is subsequently cast into a film element. The resultant film element is then biaxially stretched, heat set and heat relaxed in order to improve the physical properties. Other procedures involved, such as the application of certain subbing layers, the coating of photographic emulsions and the like, the application of protective top-coats, etc., are all well known in the photographic art.

The need for films which exhibit good permeability to water vapor in photographic elements is disclosed in Land, U.S. Pat. No. 3,573,044. Polyester films, particularly polyethylene terephthalate films, would appear to be particularly useful for this purpose because of their dimensional stability and excellent clarity. However, polyester films are conventionally relatively impermeable to water vapor.

The present invention satisfies this need.

SUMMARY OF THE INVENTION

A biaxially oriented, heat set linear polyester film with high water vapor permeability, wherein the polyester is comprised of the reaction product of (1) a glycol diester of a dicarboxylic acid, (2) a high molecular weight polyethylene glycol, and (3) an alkali metal salt of a sulfonic acid-substituted dicarboxylic acid ester (hereafter the sulfonate). This new film, after casting, stretching, heat setting and heat relaxing, has a high, over-all permeability to water vapor without substantial loss of other physical properties compared to a similar film prepared without the high molecular weight polyethylene glycol and the sulfonate.

DESCRIPTION OF THE PREFERRED EMBODIMENTS

Figure 1:
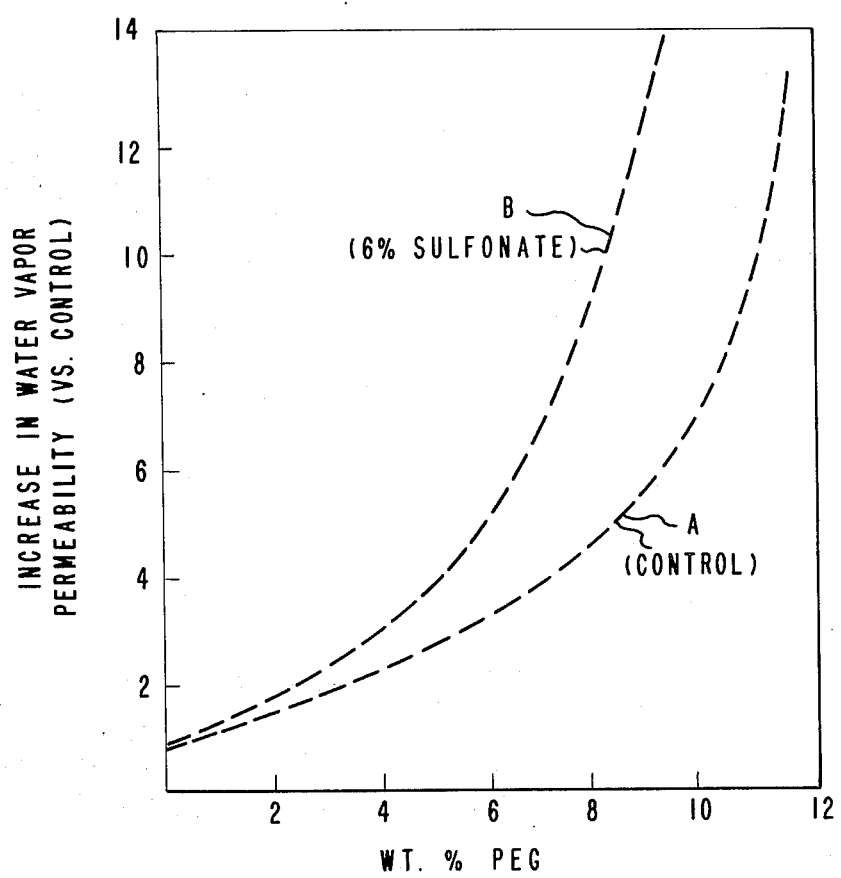
FIG. 1 is a graph which compares the water vapor permeability of a typical polyester of this invention at various levels of high molecular weight polyethylene glycol, (hereafter PEG), Curve B, with a control, Curve A, which omits the sulfonate.

Films prepared by modifying polyethylene terephthalate with small amounts of PEG with an average molecular weight of about 3500 and sodium-3,5-dicarbomethoxy benzene sulfonate are preferred. Polyethylene glycols with an average molecular weight of about 600–20,000 will function, although those with average molecular weights of about 2,000–8,000 are preferred. Varying levels of PEG may be used to achieve a wide range of water vapor permeability. We prefer to use about 2–12 weight percent of PEG based on total polymer, with about 2–8 weight percent of the sulfonate. Polyethylene terephthalate films prepared from these ingredients will have good physical properties (clarity, tensile strength, dimensional stability, etc.) and most significantly will have higher water vapor permeability (hereafter permeability) compared to films prepared without PEG and the sulfonate.

DETAILED DESCRIPTION OF THE INVENTION

It is well known that the permeability of polyester films can be increased greatly by the addition of a wide range of high molecular weight polyethylene glycols during the formation of the initial polymer. Polyethylene glycols are discussed in detail in H. F. Mark's *Encyclopedia of Polymer Science & Technology*, Vol. 6 (1967) (Wiley & Sons) and have the formula

$$HO-(CH_2-CH_2-O)_x-H$$

where X is about 2 to 50 or higher.

Polyethylene glycols with an average molecular weight as low as 600 or less and as high as 20,000 will all increase the permeability of polyester films. At molecular weights in excess of 20,000 the PEG may impair the film properties of the polyester by reducing its clarity and rigidity, and may also make it too costly to produce commercially. In order to achieve desirable levels of permeability, it is necessary to use inordinately high levels of polyethylene glycols with molecular weights lower than about 600. Films prepared at these higher levels have greatly reduced physical properties (e.g., dimensional stability, tensile strength and the like) and hence are not useful as film and/or cover supports for photographic elements, for example.

In order to achieve the high permeability to water vapor desired for the present invention, it is preferred to use about 2–12 weight percent, based on the total polymer, of PEG, and about 2–8 weight percent of the sulfonate. As explained above, such permeability can also be achieved by use of a higher amount of PEG alone, but as more and more is added to the reaction mass in order to achieve the desired level of permeability, other film properties (e.g., dimensional stability) begin to deteriorate. Thus, polyester films prepared with a high level of PEG (above 12 weight percent, for example) tend to lose stiffness.

The addition of the sulfonate alone has only a slight effect on the permeability of the film, but the combination of PEG plus sulfonate results in greatly increased permeability compared to a film with the same amount of PEG alone. This is a synergistic effect and was totally unexpected, since the prior art does not describe the use of the sulfonate as an ingredient which can be used to significantly increase permeability.

While sodium-3,5-dicarbomethoxy benzene sulfonate is preferred, other analogous aromatic sulfonates such as those described in U.S. Pat. No. 3,018,272 may be used. These include other alkali metal salts (potassium, lithium, etc.) of the above referenced compound, as well as alkali metal 1,2-dicarbomethoxy-4-benzene sulfonates and alkali metal 3,7-dicarbomethoxy-naphthalene-1-sulfonates, for example.

Films prepared from these ingredients also retain desired physical properties, including dimensional stability. Of course, for non-photographic purposes, there may be uses for films with lower dimensional stability and a somewhat higher level of permeability. It should be understood that providing a permeable film suitable for photographic applications is one of the primary objects of this invention and that a careful balance of permeability and other film properties (e.g., dimensional stability, etc.) must be maintained. This can be achieved by varying both the PEG and sulfonate addition and by adjusting the conditions under which the film is made.

Some typical dicarboxylic acids and dihydric alcohols which can be used, along with the PEG and the sulfonate, to prepare polyester films useful in this invention are disclosed in Alles, U.S. Pat. No. 2,779,684 and the patents cited therein. Other materials for modification may include the polyethylene terephthalate/isophthalate mixture of British Pat. No. 766,290. A preferred class of polyesters is prepared from the catalytic reaction of terephthalic acid, or an esterforming derivative thereof, and a polymethylene glycol having the formula:

$$HO(CH_2)_nOH$$

wherein n is an integer from 2 to about 10, together with an alkali metal salt of a sulfonic acid-substituted dicarboxylic acid ester, and the high molecular weight polyethylene glycol described previously.

Polyesters are conventionally prepared by a continuous polymerization process employing, for example, an ester exchange column, a monomer boiler, and various finishing equipment. Various amounts of high molecular weight polyethylene glycols can be added at any point in the process. It is preferred to add the PEG late in the process to minimize degradation to a lower molecular weight species with subsequent deleterious side effects on the finished polymer. It is also preferred to add the sulfonate late in the process to achieve maximum effect on permeability and film quality.

Although a variety of permeability tests exist, all test procedures are based on the mathematical model:

$$Q = PAt(dp/dx)$$

representing a quantity of water vapor "Q" passing in an interval of time "T" through a barrier of a measured area "A" with a difference of pressure—or partial pressure—"dp" across the film thickness "dx". Permeability is the constant of proportionality "P". Rearranging the equation, it is seen that permeability is the mass of permeating vapor passing through a unit cube of barrier material in a unit time under a unit differential pressure at steady state conditions. In terms of units, permeability is usually expressed as $cm^2/s/cm$ Hg, stating also the film thickness "s". The procedures for testing for water vapor permeability in film elements is basically covered by ASTM Standard Procedure #E-96. This procedure, however, involves time-consuming steps and is cumbersome to use. A simpler procedure is to use an apparatus (Permatron° -W) which can be obtained from Modern Controls, Inc., 3040 Snelling Avenue S., Minneapolis, Minn. 55406. For the purposes of the examples of this invention, the permeability of the films shown were measured with this instrument and are reported as g - mil/($100^2$m - hr), hereafter called IPV/mil, and are also shown as a ratio of permeability of the film to the permeability of a control film.

A permeability about ten-fold greater than that of polyethylene terephthalate film alone (about 550 IPV/mil) is desirable when the films of this invention are used in photographic applications. This level of permeability can be achieved by the addition of about 4–10 weight percent of, for example, PEG with a molecular weight of about 3500 coupled with about 3–6 weight percent sodium-3,5-dicarbomethoxy benzene sulfonate as shown in FIG. 1.

The films may be further treated to promote adhesion. This may be achieved by such well-known procedures as the application of subbing layers or by flame or electric spark treatment or both. These steps, together with the steps of applying photographic emulsions, abrasion layers, and the like, are well known and illustrate some of the practical uses for these films.

The invention will now be illustrated by the following specific examples:

EXAMPLE 1

Five separate polymer samples were prepared as follows:

Sample A was prepared from the catalytic homopolymerization of bis-2-hydroxyethyl terephthalate monomer alone (the control).

Sample B was prepared from the catalytic polymerization of the following ingredients:

| Ingredient | Amount Used (g) |
| --- | --- |
| Dimethyl Terephthalate | 388 |
| Ethylene Glycol  (1) | 273 |
| Polyethylene Glycol, M.W. ca 3500 (2) | 36 |
| Potassium-3,5-dicarbomethoxy benzene sulfonate (3) | 28.4 |
| Antimony Trioxide | 0.189 |
| Sodium Acetate (anhydrous) | 0.16 |
| Zinc Acetate (dihydrate) | 0.136 |

All of the above ingredients except the PEG were placed in a reaction vessel equipped with a suitable distillation column and heated in a nitrogen atmosphere. Methyl alcohol was distilled off until the amount removed indicated that the ester interchange (ethylene glycol for methyl alcohol) reaction was complete. The reaction mixture was then cooled, an agitator inserted and a suitable vacuum system connected thereto. The temperature was increased slowly up to 280° C. while the pressure was reduced from about 50 mm Hg. (start) to 0.7 mm Hg. (finish). Total reaction time was about 7 hours. After about 1 hour under reduced pressure the PEG (36 g) was added to the reaction mass. Polymerization was considered to be complete about 1 hour after the polyethylene glycol had been added and when the melt viscosity (as measured by the agitator torque) was equivalent to that of the control (Sample A).

Sample C—same as B but with the lithium sulfonate.
Sample D—same as B but with the sodium sulfonate.
Sample E—same as B with dimethyl isophthalate in place of the sulfonate.

These polymers were extruded into films in a conventional manner and the films were biaxially oriented by stretching about three times longitudinally and about three times transversely and were heat set. Each sample was prepared in such a manner as to maintain about 0.38 mole percent of the PEG (molecular weight ca 3500) and about 4.34 mole percent of the sulfonate or isophthalate in the final polymer. The films were tested for permeability to water vapor using ASTM Standard Procedure #F-372-73. The following results were obtained:

|   |   |                      | Water Vapor Permeability | |
|---|---|----------------------|---------|------------------|
|   |   |                      | IPV/mil | Ratio To Control |
| A | - | Control              | 55      | 1.0              |
| B | - | Potassium Sulfonate  | 396     | 7.2              |
| C | - | Lithium Sulfonate    | 759     | 13.8             |
| D | - | Sodium Sulfonate     | 468     | 8.5              |
| E | - | Isophthalate (Control) | 253   | 4.6              |

EXAMPLE 2

Four separate polymer samples were prepared for this example. Sample A was prepared by the catalytic homopolymerization of bis-2-hydroxyethyl terephthalate monomer alone. Sample B was prepared by copolymerizing the monomer of Sample A with about 5 weight percent (3.47 mole percent) of sodium-3,5-dicarbomethoxy benzene sulfonate based on the monomer. Sample C was prepared by copolymerizng the monomer of Sample A with about 11 weight percent (0.53 mole percent) of PEG with a molecular weight of about 3500. Sample D was prepared by copolymerizing the monomer of Sample A with about 7 weight percent of the sulfonate of Sample B and about 11 weight percent of the same PEG as in Sample C.

The polymerization step was carried out in each case in suitable reaction equipment and employing a catalyst system comprising 90 ppm zinc acetate and 350 ppm antimony trioxide (See Example 1). The reactions were each carried out in an identical manner until the melt viscosities were equivalent in each case. The polymers obtained were extruded into film samples as further described in Example 1. The following results were obtained:

|   |   |            | Glass Trans.[1] | Water Vapor Permeability | |
|---|---|------------|---------|---------|------------------|
|   |   | Sample     | Temp(Tg) | IPV/mil | Ratio to Control |
| A | - | Control    | 78      | 55      | 1.0              |
| B | - | Aromatic Sulfonate alone | 82 | 106 | 1.93 |
| C | - | PEG alone  | 39      | 671     | 12.2             |
| D | - | of this invention | 61 | 1540 | 28 |

[1]The glass transition temperature (Tg) is one of the measurements used to indicate film dimensional stability. In these polymers, a low Tg indicates that a film with less desirable properties can be made therefrom.

These results show the surprising synergistic effect of introducing the sulfonate and PEG in polyester film. If it is desired to have less permeability in order to improve some other film property, one simply has to reduce the amount of polyethylene glycol. Film D, representing the invention, retains good dimensional stability and has high permeability.

FIG. 1 shows the results obtained when several film samples were prepared as described above at varying levels of PEG (Curve A). The same permeability can be achieved at lower levels of PEG by adding the sulfonate of this invention as shown in the second Curve (B) in this drawing.

EXAMPLE 3

Five polyethylene terephthalate films were made under conditions previously described in Example 1 with a constant level of PEG (molecular weight ca. 3500) and a varying level of sodium-3,5-dicarbomethoxy benzene sulfonate. Results are as follows:

| Sample | Additives | Mole % | Relative Permeability (Ratio to Control) |
|--------|-----------|--------|------------------|
| A-Control | None   | —      | 1.0              |
| B-     | PEG alone | 0.38   | 4.8              |
| C-     | Sulfonate | 1.49   | 6.6              |
|        | PEG       | 0.39   |                  |
| D-     | Sulfonate | 2.94   | 7.5              |
|        | PEG       | 0.38   |                  |
| E-     | Sulfonate | 4.34   | 8.5              |
|        | PEG       | 0.38   |                  |

As the sulfonate level is increased, the permeability is increased. All film samples prepared were useful as film supports for photographic elements and the like.

EXAMPLE 4

Four polyethylene terephthalate films were prepared as described in Example 3 varying, in this example, the molecular weight of the PEG added. In each case (except for the control) the amount of sulfonate added was the same. After the films had been made, the permeability was measured as described in Example 1 with the following results:

| Sample | M.W. of PEG Added | Wt. % | Mole % | Permeability (Ratio to Control) |
|--------|---------|-------|--------|------------------|
| A-Control | None | —     | —      | 1.0              |
| B      | Ca. 400 | 7.98 | 4.13   | 3.8              |
| C      | Ca. 3500 | 7.98 | .38   | 8.5              |
| D      | Ca. 20,000 | 7.98 | 0.086 | 5.8             |

Once again, all of these films had good film properties and could have been used as supports for photographic elements, and, in the case of samples B and C, as cover layers. Sample D would not have been useful as a cover layer because it was translucent, instead of being transparent as in the case of B and C.

EXAMPLE 5

In this example, the main polymer was prepared by ester interchange of dimethyl terephthalate in the presence of a mixture of ethylene glycol (2 GT) and butylene glycol (4 GT), wherein the ratio was 5:1 2 GT:4 GT. In this case, the catalyst and level used was as previously described and the modifiers of this invention (PEG, M.W. ca. 3500 and sodium-3,5-dicarbomethoxy benzene sulfonate) were added at a level of 4.32 mole % and 0.38 mole % respectively. The film obtained from this product had good tensile strength and clarity and a permeability of 6.2 relative to the control.

EXAMPLE 6

Four polyethylene terephthalate films were prepared as described in Example 3. In each case (except the control) the same amount of PEG (M.W. ca. 3500) was added (0.38 mole %). In one sample, 4.34 mole % of sodium-3,5-dicarbomethoxy benzene sulfonate was added. In the other samples, the same amount (4.34 mole %) of two other sulfonates were used. The films were made and the permeability measured with the following results:

| Sample | Sulfonate Used | Permeability (Ratio to Control) |
| --- | --- | --- |
| A-Control | None | 1.0 |
| B | Na-3,5-dicarbomethoxy benzene sulfonate | 8.5 |
| C | Na-1,2-dicarbomethoxy-4-benzene sulfonate | 8.0 |
| D | Na-3,7-dicarbomethoxy naphthalene-1-sulfonate | 4.5 |

These films also had good properties (clarity, etc.) and could also have been used as supports or as cover layers for a photographic element.

EXAMPLE 7

A polyethylene terephthalate polymer containing about 2.15 mole percent sodium-3,5-dicarbomethoxy benzene sulfonate and about 0.38 mole percent of PEG (M.W. ca. 3500) was prepared according to the teachings of Example 1. The polymer was split into six portions. Films were extruded from each portion, as described in Example 1, and were then each biaxially oriented by stretching about 3.6 times longitudinally and about 3.6 times transversely at 83° C. in a conventional manner. Each film was then heat set at varying conditions and the permeability measured. Results are as follows:

| Sample | Heat Set Conditions Temp. (°C.) | Heat Set Conditions Time (Sec.) | Water Vapor Permeability IPV/Mil | Water Vapor Permeability Ratio to Control |
| --- | --- | --- | --- | --- |
| Control - No PEG or Sulfonte | — | — | 55 | 1.0 |
| 1 | 200 | 10 | 300 | 5.5 |
| 2 | 200 | 15 | 333 | 6.1 |
| 3 | 200 | 30 | 390 | 7.1 |
| 4 | 225 | 10 | 391 | 7.1 |
| 5 | 225 | 15 | 536 | 9.7 |
| 6 | 225 | 30 | 565 | 10.3 |

Thus, it is possible to adjust film preparation conditions (which have a direct bearing on ultimate film properties) and still maintain good permeability.

The films of this invention can be used as supports and/or cover sheets for any of the conventional silver halide systems (e.g., silver bromide, chloride, iodide or mixtures of these halides). The emulsions may contain dyes, color couplers, transfer dyes and the like, all well known to those skilled in the art. The films can also contain conventional additives. For example, carbon black can be added to the polymer melt prior to extruding or casting to form a black film base which is also useful as a photographic support. In one specific embodiment the polyester film of this invention is used in a film sandwich in which one film serves as the support or bottom layer of the sandwich (this layer may contain carbon black) and another of these films serves as the top layer or cover sheet; the intermediate layer or layers may be composed of silver halide emulsion and the like. Other layers containing adjuvants may also be present as described in the previously cited Land patent.

Permeable films prepared as taught in this invention may also be used as wrapping for fresh foods such as vegetables and fruits. Conventional polyester films, although very tough and strong, typically do not allow sufficient vapor to permeate through them, and hence are rarely used to wrap fresh food.

I claim:

1. A biaxially oriented, heat set linear polyester film with high water vapor permeability, wherein the polyester is comprised of a reaction product of (1) a glycol diester of a dicarboxylic acid, (2) a high molecular weight polyethylene glycol, and (3) an alkali metal salt of a sulfonic acid-substituted dicarboxylic acid ester.

2. The polyester film of claim 1 wherein said glycol diester (1) is bis-2-hydroxyethyl terephthalate.

3. The polyester film of claim 1 wherein said polyethylene glycol (2) has a molecular weight of 600 to 20,000.

4. The polyester film of claim 1 wherein said polyethylene glycol (2) has a molecular weight of 2000 to 8000.

5. The polyester film of claim 1 wherein said alkali metal salt of a sulfonic acid-substituted dicarboxylic acid ester (3) is selected from the group consisting of an alkali-3,5-dicarbomethoxy benzene sulfonic acid, an alkali-1,2-dicarbomethoxy-4-benzene sulfonic acid, and an alkali-3,7-dicarbomethoxy naphthalene-1-sulfonic acid.

6. The polyester film of claim 1 wherein said polyethylene glycol (2) is used in an amount of 2–12%, and said alkali metal salt of a sulfonic acid-substituted dicarboxylic acid ester (3) is used in an amount of 2–8%, the percentages being in % by weight of the reaction product.

7. The polyester film of claim 2 wherein said polyethylene glycol (2) has a molecular weight of about 3500 and is used in an amount of about 4–10%, and said alkali metal salt of a sulfonic acid-substituted dicarboxylic acid ester is sodium-3,5-dicarbomethoxy benzene sulfonate and is used in an amount of about 3–6%, the percentage being in % by weight of the reaction product.

8. A process for preparing a polyester film which comprises synthesizing a polyester of (1) a glycol diester of a dicarboxylic acid, (2) a high molecular weight polyethylene glycol, and (3) an alkali metal salt of a sulfonic acid-substituted dicarboxylic acid ester, casting the polyester into film, and biaxially stretching and heat setting said film to achieve dimensional stability and a permeability to water vapor of about 160–1100 IPV/mil as measured by ASTM Standard Procedure No. F-372-73.

9. The process of claim 8 wherein (1) is bis-2-hydroxyethyl terephthalate, (2) is polyethylene glycol with a molecular weight of about 3500, and (3) is sodium-3,5-dicarbomethoxy benzene sulfonate.

10. The process of either claim 8 or 9 comprising the further step of coating the biaxially stretched and heat set film with at least one photographic silver halide emulsion.

11. The process of either claim 8, 9 or 10 wherein the polyester film contains carbon black.

* * * * *